US009465947B2

(12) United States Patent
Nakhjiri

(10) Patent No.: US 9,465,947 B2
(45) Date of Patent: Oct. 11, 2016

(54) SYSTEM AND METHOD FOR ENCRYPTION AND KEY MANAGEMENT IN CLOUD STORAGE

(71) Applicant: SAMSUNG SDS AMERICA, INC., Ridgefield Park, NJ (US)

(72) Inventor: Madjid Nakhjiri, Los Gatos, CA (US)

(73) Assignee: SAMSUNG SDS AMERICA, INC., Ridgefield Park, NJ (US)

( * ) Notice: Subject to any disclaimer, the term of this patent is extended or adjusted under 35 U.S.C. 154(b) by 0 days.

(21) Appl. No.: 14/507,720

(22) Filed: Oct. 6, 2014

(65) Prior Publication Data
US 2015/0186657 A1  Jul. 2, 2015

Related U.S. Application Data

(60) Provisional application No. 61/862,228, filed on Aug. 5, 2013.

(51) Int. Cl.
*H04L 29/06* (2006.01)
*G06F 21/60* (2013.01)
*H04L 9/08* (2006.01)
*H04L 9/32* (2006.01)
*G06F 21/10* (2013.01)

(52) U.S. Cl.
CPC ............ *G06F 21/602* (2013.01); *G06F 21/10* (2013.01); *H04L 9/0822* (2013.01); *H04L 9/0825* (2013.01); *H04L 9/0836* (2013.01); *H04L 9/0894* (2013.01); *H04L 9/3213* (2013.01); *H04L 63/06* (2013.01); *H04L 63/104* (2013.01); *G06F 2221/0753* (2013.01); *G06F 2221/0768* (2013.01); *G06F 2221/2137* (2013.01); *H04L 63/083* (2013.01); *H04L 2463/061* (2013.01)

(58) Field of Classification Search
CPC . H04L 9/0822; H04L 63/083; G06F 21/602; G06F 21/10
USPC ......................................................... 713/155
See application file for complete search history.

(56) References Cited

U.S. PATENT DOCUMENTS

| | | | |
|---|---|---|---|
| 6,868,160 B1* | 3/2005 | Raji .................... | H04L 9/302 380/277 |
| 7,822,712 B1* | 10/2010 | Robinson .......... | G06F 17/30383 707/624 |
| 2005/0238175 A1* | 10/2005 | Plotkin ................ | H04L 9/0894 380/281 |
| 2006/0168446 A1* | 7/2006 | Ahonen ................ | H04L 9/0822 713/163 |
| 2007/0192832 A1* | 8/2007 | Qi ..................... | G06Q 20/3821 726/3 |
| 2007/0250713 A1* | 10/2007 | Rahman ............... | H04L 63/162 713/171 |
| 2008/0065888 A1* | 3/2008 | Zheng .................. | H04L 9/0844 713/171 |
| 2013/0203384 A1* | 8/2013 | Narasimhan ........ | H04L 63/0227 455/411 |
| 2013/0283392 A1* | 10/2013 | Mirashrafi ............ | G06F 21/10 726/26 |
| 2014/0075184 A1* | 3/2014 | Gorbach ................ | H04L 63/06 713/155 |
| 2014/0229736 A1* | 8/2014 | Asim ................... | H04L 9/0847 713/171 |
| 2014/0281477 A1* | 9/2014 | Nayshtut ............. | H04L 9/0825 713/150 |
| 2014/0344850 A1* | 11/2014 | Wajs ................ | H04N 21/26606 725/31 |

OTHER PUBLICATIONS

Liang Yan;Strengthen Cloud Computing Security with Federal Identity Management Using Hierarchical Identity-Based Cryptography; year: 2009; South China Normal University; p. 167-177.*

* cited by examiner

Primary Examiner — Monjour Rahim
(74) Attorney, Agent, or Firm — Sughrue Mion, PLLC

(57) ABSTRACT

A cloud storage system includes an encryption server configured to encrypt a plurality of data by using encryption keys having a hierarchy, the hierarchy of encryption keys corresponding to a relationship among the plurality of encrypted data, and a cloud storage server configured to store the plurality of encrypted data.

17 Claims, 7 Drawing Sheets

SYSTEM AND METHOD FOR ENCRYPTION AND KEY MANAGEMENT IN CLOUD STORAGE

CROSS-REFERENCE TO RELATED APPLICATION

This application claims the benefit of U.S. Provisional Application No. 61/862,228, in the U.S. Patent and Trademark Office, the disclosures of which are incorporated herein by reference in their entireties.

BACKGROUND

1. Technical Field

Systems and methods consistent with exemplary embodiments relate to encryption and key management in a cloud storage.

2. Discussion of Related Art

As the use of cloud-based storage and file sharing becomes more widespread, ensuring security and privacy in uploading and/or downloading data while also reducing cost to end-consumers and enterprises has become gradually more important. One tool for decreasing cost is increasing server and space utilization rate through virtualization and introducing multi-tenancy in the cloud service, i.e., offering a "public cloud". However, when a plurality of users exchange and share data in the public cloud, the demand for technology for securely delivering data between the users has gradually increased.

Secure sockets layer (SSL) is primarily used to encrypt data sent over the public cloud. However, using SSL, a terminal manages a separate certificate for issuing a private key, thereby imposing a burden for certificate management on the terminal. Also, safety in a key issuance process may not be ensured. In particular, when a large number of files are shared among a plurality of users, key management may become complicated. Moreover, efficiency of a cloud storage may be reduced since the same data may be encrypted multiple times with different encryption keys due to multiple users. Not only, this sets bigger strain on computing resources, but also, when same data is encrypted with different keys, it produces different encrypted files, which hinders the operation of de-duplication systems that aim to reduce storage.

SUMMARY

One or more exemplary embodiments provide a file storage system in which data is encrypted for a user according to a key hierarchy, where relationship among the keys is mapped to relationships among access policies.

One or more exemplary embodiments also provide a stateless encryption server that may simply receive encryption keys or parameters for calculation of encryption keys from outside.

One or more exemplary embodiments further provide a key management system separate from a cloud storage service.

According to an aspect of an exemplary embodiment, a file storage system which stores objects in an encrypted format at a storage server and controls each user's access to objects through controlling access to decryption keys is provided.

In the file storage system, when required by access policies, objects may be encrypted by an encryption server using content encryption keys (CEKs). The content encryption keys may be generated based on a key hierarchy, and are accessible to the encryption server. The content encryption keys may be generated outside of the encryption server. A relationship between one content encryption key and other content encryption keys in the key hierarchy may be mapped to a relationship between objects being encrypted. The relationship between the objects being encrypted may correspond to a relationship between access policies or file directories within which the objects being encrypted reside. In an exemplary embodiment, the same content encryption key may be used for the objects being encrypted which belong to the same file directory, in which all the files therein have the same access policy. Thus, the same content encryption key may be used for encryption of more than one object. Also, the content encryption key may be used by more than one user of the same object. In this manner, the burden of key management as well as file storage may be reduced.

The content encryption key may be delivered to a user in an encrypted form, using a key encryption key (KEK), which belongs to at least one from among a unique user and a pre-defined group.

The key encryption key may be one of a Rivest-Shaman-Adleman (RSA) public key, an identification (ID)-based cryptography (IBC) public key, a symmetric key, and the key encryption key may be delivered through a secure channel to the user.

The encrypted form provided by the key encryption key may correspond to use of IBC encryption.

The IBC key encryption key may be delivered to the user, possibly through use of a secure channel, following a user authentication process.

The authentication service may be provided by a standalone (possibly not provided by cloud storage service) authentication server issuing authentication tokens for use by at least of one the user, a license server and a private key generator server. The authentication service may be part of the identity management system belonging to the organization/enterprise that is using the cloud storage service.

The authentication token may be used by the license server to create a license server ticket.

The license server ticket may be used by the private key generator server to authenticate the user before delivering the key encryption key (or the IBC private key).

The license server ticket may include a function of a user credential that the user uses for authentication to the private key generator server.

The authentication token may be issued for use by the private key generator server directly.

The key encryption key may be obtained from a user's locally available storage.

The user may be at least one from among an identifiable individual having, for example, a role within an organization, and a software application, requiring access to an object. An access policy may be specified based on at least one from among the user's role within a circle, a relationship between objects to be encrypted, a file directory structure, and a sensitivity level of an object.

The content encryption keys may be generated in a stateless manner based on a set of key derivation instructions that are receivable by the encryption server.

The key derivation instructions may include information on how to obtain key derivation information including at least one from among a set of a root key, a key derivation function, auxiliary information, and a key derivation policy.

The information on how to obtain key derivation information may be stored at a resource, whose location is conveyed to the encryption server, through a uniform resource identifier (URI), which may be accessed by the encryption server along with a representational state transfer (REST) instruction, such as a Hypertext Transfer Protocol Secure (HTTP)/HTTPS request.

A unique signature of each encrypted file may be created and used in storage de-duplication algorithm. The same content encryption key may be used for the same object regardless of the user, which may improve efficiency of signature creation and the de-duplication algorithm.

A separate key hierarchy may be generated based on a root key that is unique to each organization.

The content encryption key may be a temporary key, whose life time is specified as part of key derivation mechanism and life time information may be stored as metadata at the storage system, which upon expiry of the key may initiate at least of one an alert, actions to renew the key, and actions to re-encrypt data with new keys.

The storage system may not have access to the content encryption key and the key encryption key and may store files only in an encrypted form.

An initial owner of the object may contact the storage system using a REST request, provide at least one from among the object, key derivation information, and object policy group information.

BRIEF DESCRIPTION OF THE DRAWINGS

The above and/or other will be more apparent from the following detailed description of exemplary embodiments taken in conjunction with the accompanying drawings, in which.

DETAILED DESCRIPTION

Although exemplary embodiments will be described in detail below with reference to the accompanying drawings, the present disclosure is not limited thereto.

In the following description, well-known technology related to the exemplary embodiments is not described in detail in order to keep the disclosure clear and concise. Terms used herein have been chosen in consideration of functionality of the exemplary embodiments, and may vary depending on a user's or an operator's intentions, or customs in the art. Therefore, the meanings of terms should be interpreted based on the overall context of the present specification.

Herein, the term "content" is used to refer any types of files, image files, videos, audios, etc. In order to refer to an individual piece of content, the term "object" may be used.

The term "user" is used to refer to a person or an application which attempts to access data in cloud storage. The person may belong to or include a plurality of individuals, for example, in a circle of friends, a team within an organization, a department (human resource (HR), accounting, research and development (R&D)). An application may include, for example, an email application, a procurement or customer relationship management (CRM) application. An application may be a part of, for example, circles of applications that have the same access policy with respect to the content. For example, financial and/or accounting application may have access to employee salary data files, while email and/or instant messaging and/or web conferencing application may have access to employee emails, phone number data files, etc. The access policy for an application may be defined based on a function of the application, users, and/or security capability in dealing with the content.

Figure 1:
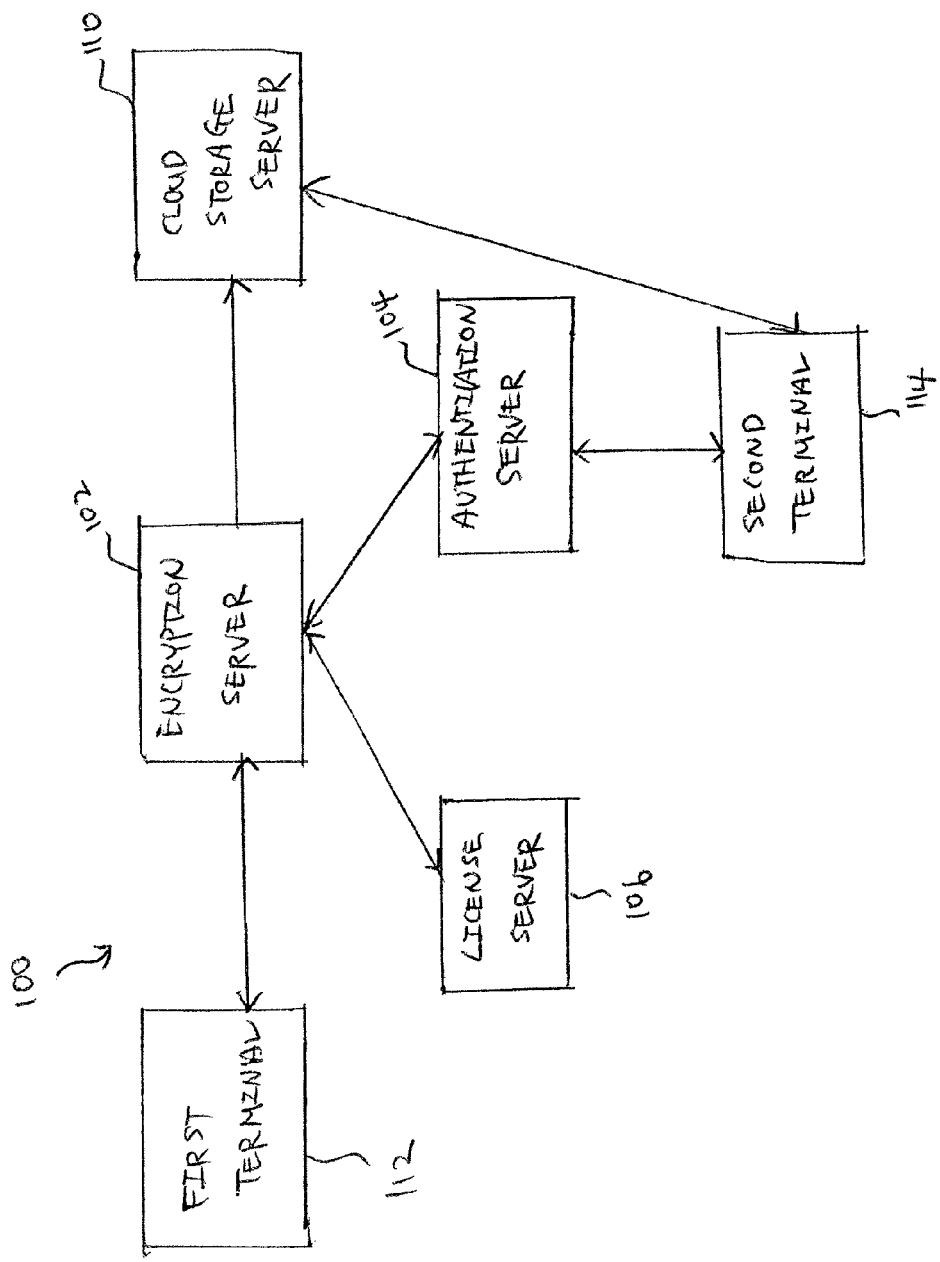
FIG. 1 is a block diagram illustrating a cloud based storage system according to an exemplary embodiment.

FIG. 1 is a block diagram illustrating a cloud based storage system 100 according to an exemplary embodiment.

Referring to FIG. 1, a cloud based storage system 100 according to an exemplary embodiment includes an encryption provider 102, an authentication server 104, a license server 106, a cloud storage server 110, a first terminal 112, and a second terminal 114.

A user of the first terminal 112 may store data in the cloud storage server 110 to be used by the user or shared with another user, e.g., a user of the second terminal 114. To do so, the first terminal 112 may establish a secure link (e.g., an Hypertext Transfer Protocol Secure (HTTPS) link that is protected with a secure sockets layer (SSL)) with the encryption server 102 and send the data, which the user of the first terminal 112 wants to store on the cloud, to the encryption server 102 to be encrypted. In this case, the first terminal 112 may contact a uniform resource identifier (URI) of the cloud storage server 110 through an HTTP session, and this session may be redirected to the encryption server 102. Here, the encryption server 102 may be operated by a security provider distinct from a cloud provider.

The encryption server 102 encrypts the data transmitted from the first terminal 112. The encryption server 102 performs encryption according to, for example, a predefined access control policy (i.e., an access policy) of the user and/or the cloud provider. In an exemplary embodiment, the access policy of the user may be based on a key hierarchy corresponding to (e.g., mapped to) a directory structure of the data in the cloud storage server 110, which will be described in detail below with reference to FIGS. 2 and 3.

Figure 2:
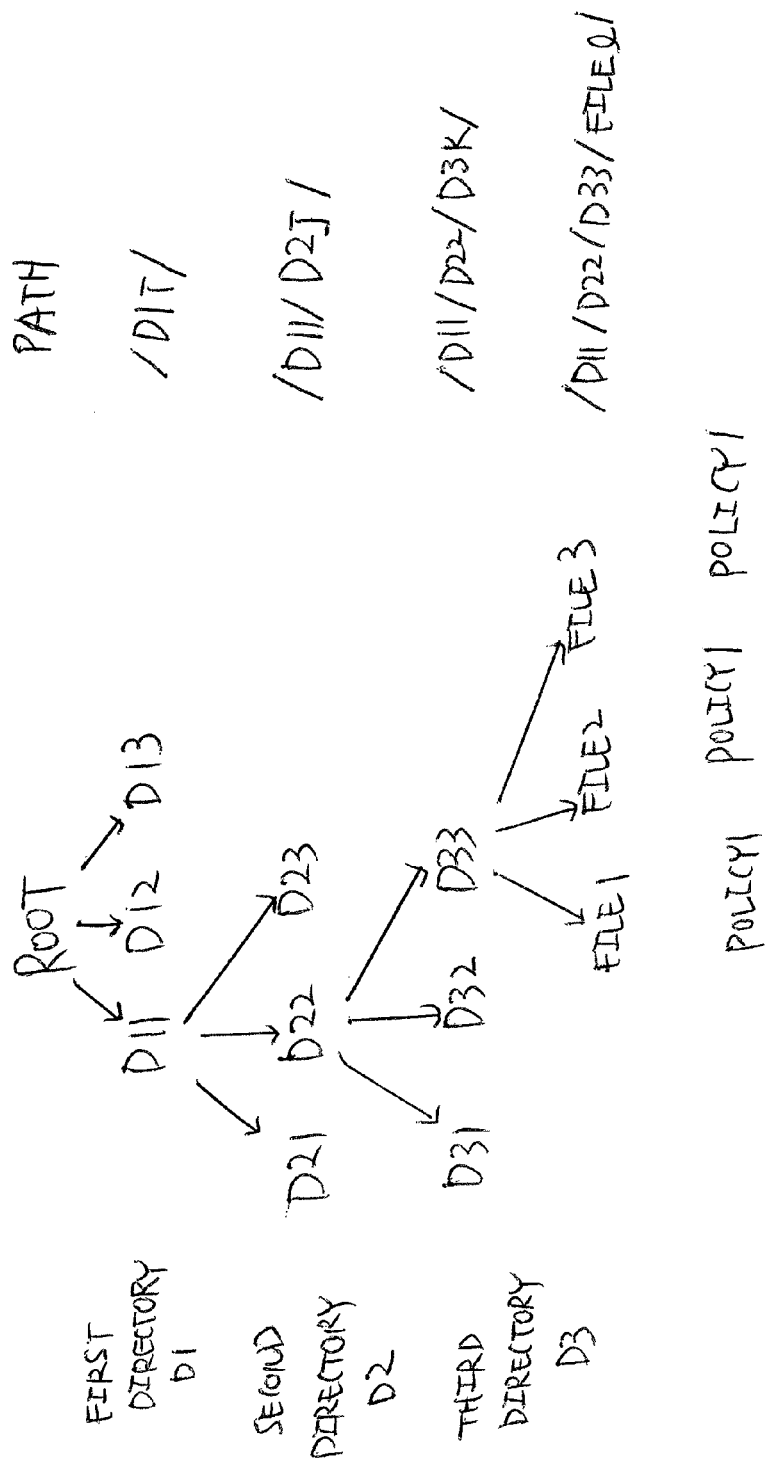
FIG. 2 is a view for explaining a directory structure of files and a method of encrypting the files according to an exemplary embodiment.

Referring to FIG. 2, according to an exemplary embodiment, data stored in the cloud storage server 110 may have a directory structure for files including a root node, first level directories D1 (i.e., directories D11, D12, and D13) under the root node, second level directories D2 (i.e., directories D21, D22, and D23) under the first level directories D1, and third level directories D3 (i.e., directories D31, D32, and D33) under the second level directories D2.

Generally, a group of objects and/or files that are encrypted using the same content encryption key (CEK) may be referred to as a homogeneous policy group (HPG). In the present exemplary embodiment, an HPG is based on the directory structure. Specifically, a lowest level directory is a directory within which all the files are governed by the same access control policy (e.g., a directory in which all files belong to the same project to be accessed only by team members of that project). In other words, if a user is authorized to see one of the files in this directory, the user can see all of the files within the directory. This allows the encryption system to encrypt all files within the directory with the same key (Kdir) mapped to the directory, while allowing authentication and licensing systems to handle access control and key management for all of the files within the directory in a similar, homogenous fashion. This directory level may be referred to as a homogenous level directory (HLD).

For example, referring to FIG. 2, all the files in the third level directory D33 may be controlled by a same access control policy. In other words, when a user is authorized to see one of files file 1, file 2, or file 3 in the third level directory D33, the user may see all the files file 1, file 2, and file 3 within the third level directory D33. Therefore, all the files within the same directory may be encrypted with the same key (i.e., content encryption key) Kdir. In this case, a key management process may employ a key hierarchy corresponding to or mapped to the directory structure. That is, all the files within the directory may be controlled by a similar, homogenous key management scheme or policy. For example, a content encryption key Kdir for encrypting the entire directory may be generated by using a root key Kr that is generated or obtained as a unique key for encrypting the root node, a path to the directory, and a key derivation policy of the user, as will be described in further detail below.

The encryption method using a key hierarchy according to the present exemplary embodiment may be implemented by the cloud based storage system 100 in a case where a plurality of users access the files based on pre-defined access control policies. Furthermore, regardless of which user is using the data, as long as the data is linked to a directory, the file is encrypted with the same algorithm and the same encryption key as other data stored in the same directory. That is, the encrypted data in the same directory has a unique signature such that, even when the data is stored by a plurality of users, all copies of the data may be effectively detected by a de-duplication algorithm implemented by the cloud storage server 110. Therefore, de-duplication may be performed with improved efficiency.

Figure 3:
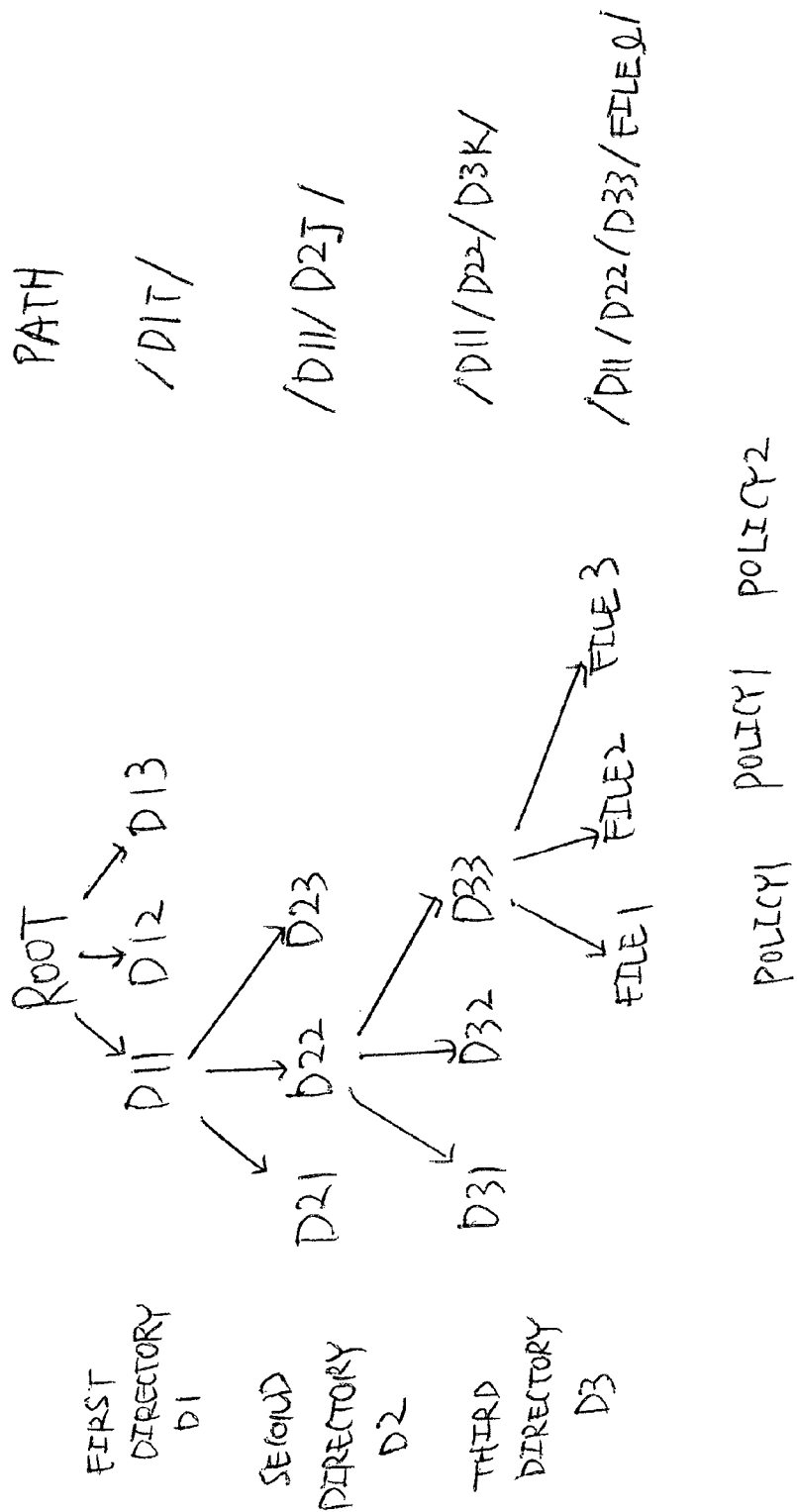
FIG. 3 is a view for explaining a directory structure of files and a method of encrypting the files according to another exemplary embodiment.

FIG. 3 is a diagram for explaining a directory structure of files and a method of encrypting the files according to another exemplary embodiment.

The access control policies in FIG. 3 are different from that shown in FIG. 2 in that files within a directory may be controlled by different policies. That is, file 1 and file 2 of the third level directory are controlled by policy 1 while file 3 is controlled by policy 2. Thus, files in the same directory may be encrypted in a different fashion according to, for example, an encryption policy field in the metadata for the file. In this case, a content encryption key Kfile for encrypting a specific file within the directory may be generated by using the encryption key Kdir for encrypting the corresponding directory and a policy which controls the specific file.

Although it is described above that access control is performed based on access policies corresponding to a directory structure, one or more other exemplary embodiments are not limited thereto. For example, in an exemplary embodiment, a plurality of objects and/or files located in different directories may be covered under the same policy. In this case, the plurality of objects and/or files may be encrypted with the same key. For example, an enterprise may store files in the cloud storage server 110 and allow employees, customers, and business partners of the enterprise to access the files based on the pre-defined access control policy.

Referring now back to FIG. 1, the encryption server 102 may obtain a content encryption key in a stateless manner. For example, the encryption server 102 may receive the access policy in a form of a key derivation policy using a representational state transfer (REST)-based instruction. In this case, the first terminal 112 may build a representational state transfer (REST) request that includes a URI reference to a resource for key derivation information including at least one of the key derivation policy, the root key Kr, and a key derivation function. According to another exemplary embodiment, the encryption server 102 may obtain the content encryption key in a stateless manner by receiving the key derivation function and implementing the key derivation function on a root key stored by the encryption server 102. The key derivation function is a cryptographic function on parameters of the key derivation information. The resource indicated by the URI may also include other information such as a corresponding directory path (or a policy group to which the data belongs to), and authorization parameters of the user. For example, the user's authorization parameters may be defined by the homogeneous policy group. The key derivation information may be stored at the license server 106, and the encryption server 102 may obtain the key derivation information by connecting to the license server 106. Based on the received key derivation information, the encryption server 102 determines (e.g., generates, obtains, etc.) the content encryption key for the content. The content encryption key may be used in a designated cryptography algorithm, which may be an advanced encryption standard (AES)-128) in an exemplary embodiment. Here, an interface between the encryption server 102 and the license server 106 may be provided to fetch the resource. The interface may be protected using Internet protocol security (IPsec) or using SSL.

The key derivation information may further include auxiliary information such as, for example, a validity period, a group name for restricting access control to a particular group of users, and a policy ID/URI for locating a specific policy document (or an encryption policy field that is part of metadata generated for the file and used for re-creation of the content encryption key CEK for decryption of encrypted objects). The validity period is a parameter that allows the license server 106 to rotate encryption keys on a predetermined period or when necessary. For example, the encryption key may be changed every month or whenever the encryption key is released to reduce the probability of piracy. The validity period may be provided with respect to a directory of data stored at the cloud storage server 100. The cloud storage server 100 may set an alarm for the encryption server 102 and the license server 106 to inform the encryption server 102 and the license server 106 of an upcoming expiration of a validity period. When the validity period expires, all files within the corresponding directory may be re-encrypted with a new encryption key. In this case, the cloud storage server 110 may send data in the corresponding directory to the encryption server 102 for re-encryption. In this manner, the cloud storage server 110 may avoid liability for privacy issues regarding stored data. When the data is re-encrypted, the second terminal 114 may be authenticated again by the authentication server 104 and receive a public key with respect to the renewed encryption key.

By way of example, the content encryption key (Kdir) may be obtained according to the following equation 1:

$$K\text{dir}=KDF(K\text{root},\text{path}|KDF\text{ Auxiliary information}),\quad\text{[Equation 1]}$$

where KDF (key derivation function) is a cryptographic function that is used on the parameters inside the parentheses, Kroot is the root key, e.g., that is generated as a unique key at top of key hierarchy for each enterprise/organization, path is the directory path (e.g. "/c/projects/cloud-project/security-architecture/"), and KDF auxiliary information (e.g., other information) includes any other parameters that may be included in key derivation (examples of which are described above).

After performing encryption, the encryption server 102 sends the encrypted data along with corresponding metadata to the cloud storage server 110. The cloud storage server 110 stores the encrypted data along with the metadata in a particular location, based on the provided metadata, which may include an encryption policy field.

In the present exemplary embodiment, the encryption server 102 may be operated by a security provider. However, it is understood that one or more other exemplary embodiments are not limited thereto and the encryption server 102 may be operated by, for example, the cloud provider.

The authentication server 104 is a server for performing user authentication of a user of the second terminal 114 (or the second terminal 114), which attempts to access data stored by the user of the first terminal 112 (or the first terminal 112) in the cloud storage server 110. In an exemplary embodiment, the authentication server 104 may include an ID and a password of the user of the second terminal 114 and authenticate the second terminal 114 through, for example, a password authentication algorithm inside an HTTPS, where a user ID and a password is asserted inside an SSL tunnel. Alternatively, the authentication may be performed by using any other type of user authentication mechanism (e.g., Extended Authentication Protocol Tunneled Transport Layer Security (EAP-TTLS) or Microsoft CHAP version 2 (MS-CHAP2)). When the user is an enterprise user, the authentication may be performed according to a security policy of the enterprise.

When the user of the second terminal 114 is authenticated, the authentication server 104 provides an authentication token Auth_token including a user ID to the license server 106.

$$\text{Auth\_token\_LS}=E[KAS\text{-}LS,AS\text{-}ID|\text{Nonce}|\text{User\_ID}|f(PSWD)|\text{validity}],AS\text{-signature},\quad\text{[Equation 2]}$$

where the nonce is a parameter that can be used to avoid replay attacks. For example, the nonce may be a random number or a time stamp pertaining to the time when the user was authenticated. f(PSWD) indicates a function of the user's password. The function can be a one-way cryptographic hash function that avoids revealing of the password. According to another exemplary embodiment, the authentication token Auth_token may include a user's password instead of the function of the user's password, e.g., when the password is not to remain private to the user and hidden from the license server 106.

The authentication token Auth_token may be encrypted by using a key shared between the authentication server 104 and the license server 106. In an alternative embodiment, the authentication token Auth_token may not be encrypted when a secure channel is established between the authentication server 104 and the license server 106. In this case, the authentication token Auth_token may include a signature performed by the authentication server 104 on the token Auth_token. By using the authentication token Auth_token, the license server 106 may determine whether a user requesting a content from the cloud storage server 110 is allowed or permitted to access the content.

According to another exemplary embodiment, instead of generating the authentication token Auth_token, the authentication server 104 may verify the authentication of the user to the license server 106 through a secure channel between the authentication server 104 and the license server 106.

When the user is an enterprise user, the enterprise user may want to manage its own keys. In this case, a dedicated encryption server may be configured with enterprise policies (e.g., directory structure, authorization policies, etc.) to apply encryption accordingly. For example, the enterprise policies may have a hierarchy structure which maps corresponding access policies. According to an exemplary embodiment, all the files within the same directory may have the same access policy. In this case, the hierarchy structure of the enterprise policies may correspond to the directory structure.

When the encryption server 102 is shared between a plurality of users, for example, when the encryption server 102 is provided by the security provider or the cloud provider, access policies may be communicated to the encryption server 102 using a REST-based instruction so that the encryption server 102 obtains the content encryption keys in a stateless manner.

For example, the encryption server 102 may store and/or receive the root key Kr and the key derivation policy KDP per user without a need for storing encryption keys for all levels of the file structure. The REST instruction may provide a URI where a resource is stored that has a representation (XML, JSON, etc) of the user's key derivation instruction, including the root key Kr, the key derivation policy KDP, and a key derivation function (KDF), policy information, file structure, etc. Thus, the encryption server 102 may refer to the URI included in the REST-based instructions from the user to locate a specific policy document. The encryption server 102 may not store the root key Kr, e.g., when the resource also provides information on the root key Kr. In this case, according to an exemplary embodiment, the root key Kr may be securely transferred to the encryption server 102 when needed.

The license server 106 determines whether the second terminal 114, which requests the data stored in the cloud storage server 110, is authorized to access the content based on a result of the authentication by the authentication server 104 (e.g., based on the authentication token Auth_token provided from the authentication server 104). When it is determined that the second terminal 114 is authorized to access the data, the license server 106 generates a license that allows the user to access the content. The license may include an encrypted content encryption key, which is encrypted for transmitting to the user of the second terminal 114 using a key encryption key that is unique to the user or a group of users to which the user belongs. In an exemplary embodiment, identity based cryptography (IBC) may be used to encrypt the content encryption key. Thus, only a user of the second terminal 114 may be allowed to use the IBC public key. Furthermore, the license may also include a ticket (LS-Ticket), which may include a validity period, an ID of the user, etc., as will be described in greater detail below. Alternatively, the ticket may use the authentication token Auth_token issued by the authentication server 104. In this way, the user's privacy may be protected.

By way of example, the license server 106 may generate the license according to the following equation 3:

$$\text{License} = \text{EIBC,Pub}B[\text{CEK}],\text{LS-Ticket.} \quad [\text{Equation 3}]$$

Although it is described that the IBC may be used to encrypt the content encryption key, it is understood that one or more other exemplary embodiments are not limited thereto. For example, the content encryption key may be encrypted by using a Rivest-Shaman-Adleman (RSA) algorithm. In this case, the license may be generated according to the following equation 4:

$$\text{License} = \text{ERSA,Pub}B[\text{CEK}],\text{LS-Ticket.} \quad [\text{Equation 4}]$$

According to another exemplary embodiment, the content encryption key may be encrypted by using symmetric AES algorithm. For example, the license may be generated according to the following equation 5:

$$\text{License} = \text{EAES},K\_B[\text{CEK}],\text{LS-Ticket.} \quad [\text{Equation 5}]$$

The cloud based storage system 100 may additionally include a private key generator (see FIG. 4) co-located with or separate from the license server to provide a private key to a user terminal. The private key generator is entity that stores a number of system wide secrets within its secure storage (e.g., a hardware security module (HSM)) and calculates private keys for authorized users based on their identity (ID) and public key (Pub). Thus, users can refer to the private key generator and after proper assertion of their credentials, receive a private key to decrypt anything that was sent to them in IBC-encrypted format (e.g., to decrypt the encrypted content encryption key).

The license server 106 may issue a ticket to the private key generator according to the following equation 6:

$$\text{LS-Ticket} = E[\text{KLS-PKG,LS-ID|Random|User\_ID}[f(\text{PSWD})]|[\text{Auth\_token\_LS}]|\text{validity}],\text{LS-signature.} \quad [\text{Equation 6}]$$

According to Equation 6, the ticket is encrypted with a key shared between the license server 106 and the private key generator (KLS-PKG) and includes an identity of license server 106 (LS-ID) and a random number (Random) that is shared out of band between the license server 106 and the private key generator. In some cases, both the license server 106 and the private key generator are run by the same security provider, while the authentication server 104 is implemented by the enterprise. In these cases, the KLS-PKG may simply be a key that is internal to the license server/private key generator housing.

The ticket also includes the User_ID, which is the same as the ID used in IBC, and a copy of the form of password as used by the user to authenticate to the authentication system. Alternatively, the ticket could simply use the Auth-token as issued by the authentication server 104 to preserve the user's and the enterprise's privacy Depending on the channel between the license server 106 and the private key generator, the encryption (E[KLS-PKG, data]) may or may not be performed. For example, if there is an IPsec VPN between the license server 106 and the private key generator, a signature may be performed by the authentication server 104 on the token. The signature may either use a public-key signature (along with license server_certificate) or simply a symmetric key that is shared between the license server 106 and the private key generator.

Later on, when a user engages in a key exchange (e.g., Isomorphisms for Password-based Authenticated Key Exchange) with the private key generator, the user sends his or her password to the private key generator using an encryption key that is arrived as part of the key exchange. In this case, the private key generator may be pre-configured with user passwords, or may be tightly integrated with the authentication server to verify the password, sent by the user. In the present exemplary embodiment, however, the private key generator receives a copy of the password through the ticket issued by the license server 106, and may not be pre-configured with passwords or be tightly integrated with the enterprise IT system.

Once the key exchange is complete, the private key generator delivers the private key to the user, so that the user can decrypt the content encryption key delivered with the license from the license server 106 and subsequently decrypt the data. The private key generator may authenticate the user using its private key generator certificates, or using implicit knowledge of the user's private key.

In an exemplary embodiment, the authentication server 104 and the license server 106 may be provided by the same entity, e.g., a security provider. Additionally, according to an exemplary embodiment, the authentication server 104 and the license server 106 may be implemented in a single server. However, it is understood that one or more other exemplary embodiments are not limited thereto. For example, according to another exemplary embodiment, the authentication server 104 and the license server 106 may be separate entities.

Figure 4:
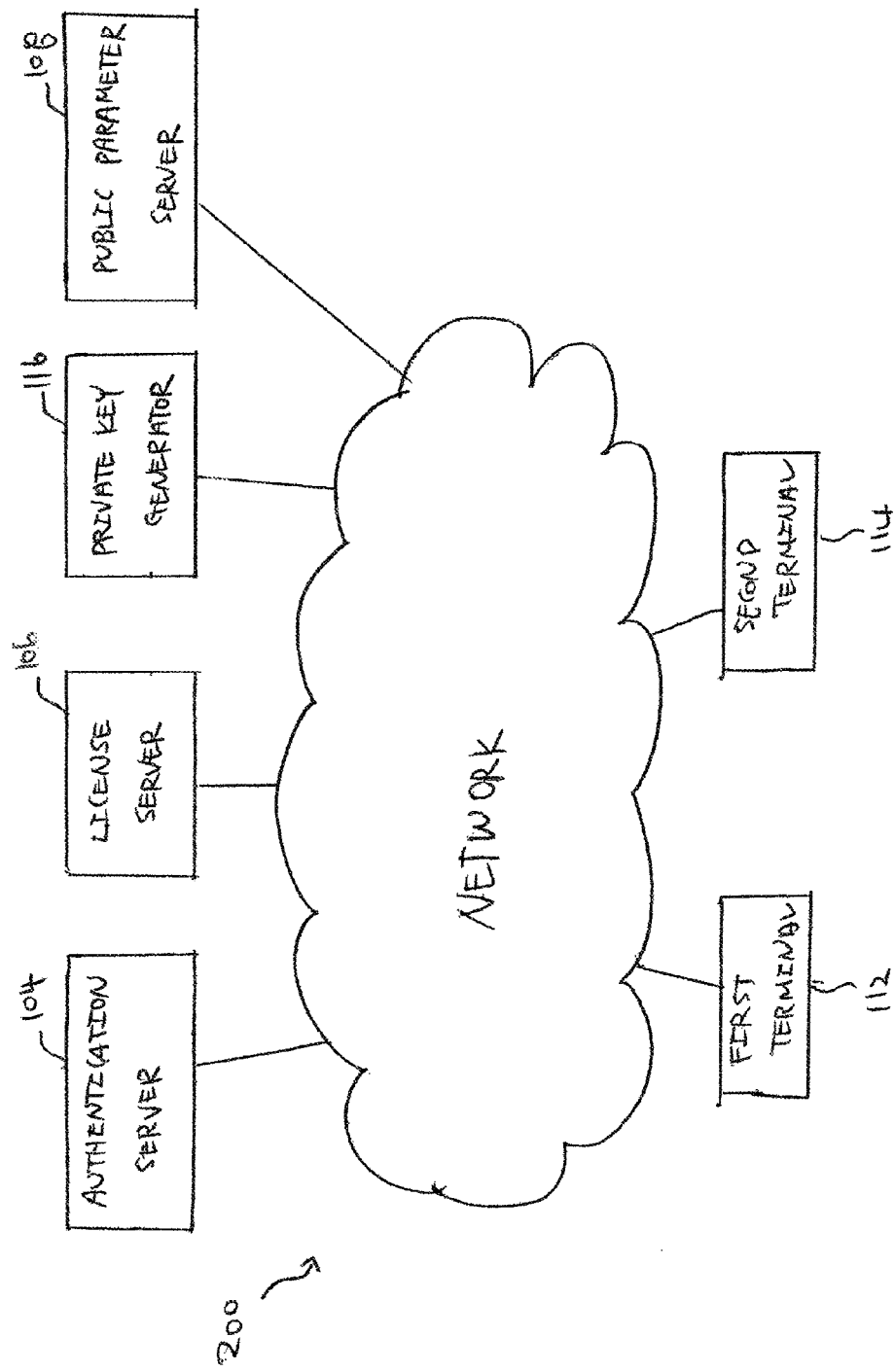
FIG. 4 is a block diagram illustrating an ID-based key management system according to an exemplary embodiment.

FIG. 4 is a block diagram illustrating an ID-based key management system 200 according to an exemplary embodiment. The same reference numerals are used to denote the same elements as those in FIG. 1, and a repeated explanation is omitted below.

Referring to FIG. 4, an ID-based key management system 200 according to an exemplary embodiment includes the authentication server 104, the license server 106, a private key generator 116, a public parameter server 108, the first terminal 112, and the second terminal 114.

The key management system 100 is configured to exchange a message (packet) through a network. In various exemplary embodiments, the network is not limited to a particular type of network and all types of networks capable of packet communication (such as a wired and/or wireless Internet network and a mobile communication network) may be included. In addition, to prevent the intrusion of a malicious user, etc., through the network, the authentication server 104, the license server 106, the private key generator 116, and the public parameter server 108 may be protected through at least a firewall.

The authentication server 104 is a server for performing user authentication on a user of the second terminal 114, which attempts to access data stored in the cloud storage server 110. In an exemplary embodiment, the authentication server 104 may authenticate the second terminal 114 through, for example, an ID-based password authenticated key exchange (i-PAKE) for a user of the second terminal 114. An authentication process by the authentication server 104 will be further described below. In addition, when the user of the second terminal 114 is authenticated, the authentication server 104 sends a terminal ID or user ID to the license server 106. The authentication server 104 may include a separate hardware security module (HSM) for authenticating an ID and a password of the user of the second terminal 114, using i-PAKE.

When the user ID is transmitted from the authentication server 104, the license server 106 generates a public key corresponding to the user ID. In an exemplary embodiment, prior to generating the public key, the license server 106 may refer to the authentication token Auth_token generated by the authentication server 104 to determine whether the second terminal 114 is authorized to access the content. When the second terminal 114 is authorized, the license server 106 may generate the public key corresponding to, for example, the user ID (when IBC is used). The exemplary embodiments are not limited thereto and may obtain the public key of the user of the second terminal 114 from other means (e.g., when RSA is used). The public key may be a key encryption key that is generated using an identity (ID)-based cryptography (IBC). In other words, the public key is used to encrypt a content encryption key (CEK) and thereby create an encrypted version of CEK that is generated directly for the user of the second terminal 114. The user of second terminal 114 then needs to obtain the private key corresponding to this public key, in order to be able to decrypt the CEK and thereafter decrypt the encrypted object and consume the data.

The private key generator 116 generates a private key corresponding to a user ID of the second terminal 114 and provides the generated private key to the authentication server 104. Although it is described that the private key generator 116 is connected to the license server 106 such that the generated private key is provided to the second terminal 114 through the license server 106, it is understood that one or more other exemplary embodiments are not limited thereto. For example, according to another exemplary embodiment, the private key generator 116 may directly transmit the generated private key to the terminal 114.

The public parameter server 108 is a server which stores and manages public parameters used for encryption of the content encryption key by the license server 106 when IBC encryption is used. A strength of encryption within the license server 106 may be determined by a set of parameters provided by the public parameter server 108.

Figure 5:
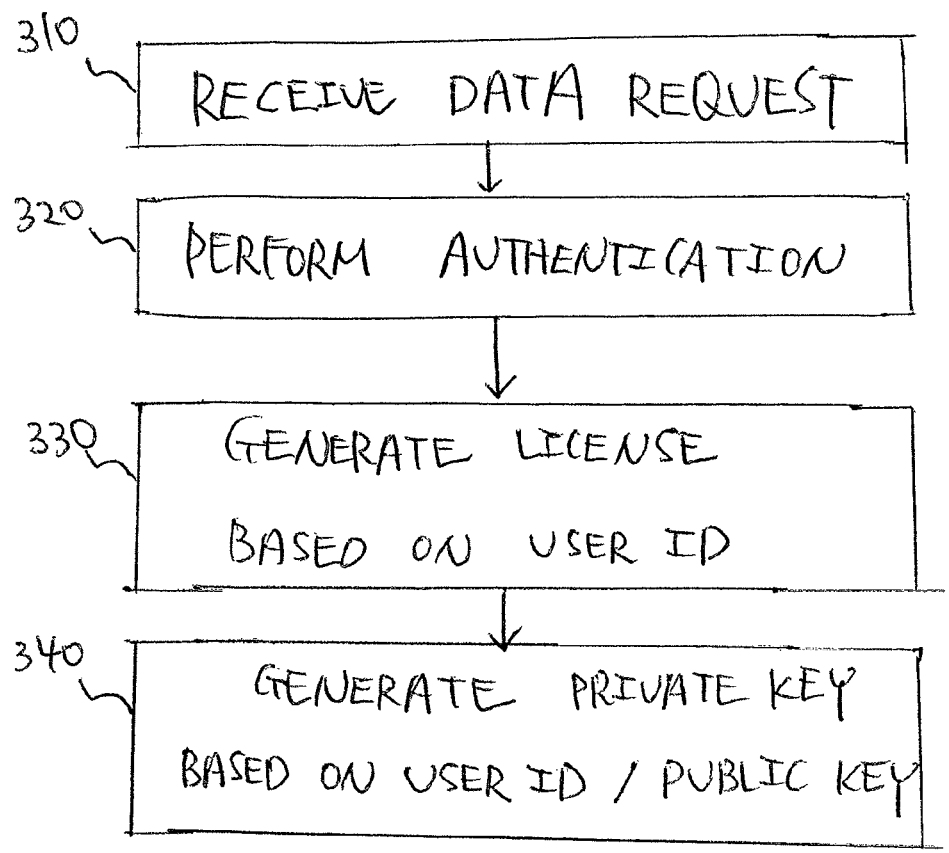
FIG. 5 is a flowchart illustrating a method of authentication and private key issuance according to an exemplary embodiment.

FIG. 5 is a flowchart illustrating a method of authentication and private key issuance according to an exemplary embodiment.

Referring to FIG. 5, in operation 310, a request for data stored in the cloud storage server 110 is received from the second terminal 114. In operation 320, the authentication server 104 may perform authentication by using an ID and a password of the user of the second terminal 114. When the second terminal 114 is authenticated by the authentication server 104, the authentication server 104 generates the authentication token Auth_token including a user ID and transmits the authentication token Auth_token to the license server 106. The authentication token Auth_token may also include a user's password or a function of the user's password. The function of the user's password may be used when the password remains private to the user and hidden from the license server 106. The function may be a one-way cryptographic hash function that avoids revealing of the password.

When the authentication token Auth_token is received by the license server 106, the license server 106 may refer to the authentication token Auth_token generated by the authentication server 104 to determine whether the second terminal 114 is authorized to access the content. When the second terminal 114 is authorized, the license server 106 generates a public key for accessing the data based on the user ID, in operation 330. In an exemplary embodiment, the public key may be the key encryption key used to encrypt the content encryption key using an identity (ID)-based cryptography (IBC). Alternatively, the content encryption key may be encrypted by using a Rivest-Shaman-Adleman (RSA) algorithm using a public key of the user of the second terminal. Still alternatively, the content encryption key may be encrypted by using symmetric AES algorithm.

Additionally, the license server 106 may generate a ticket including the user ID and a copy of a form of password used by the second terminal 114 to authenticate the authentication server 104. Alternatively, the ticket may use the authentication token Auth_token issued by the authentication server 104. In this way, the user's privacy may be protected. Also, since the password or a function of password is included in the ticket and transmitted to the private key generator 116, the private key generator 116 may not be pre-configured with passwords or integrated with the authentication server 104 to verify the password sent by the user. The ticket may also include metadata including, for example, a validity period.

In operation 340, a private key is calculated based on the public key and/or the metadata and transmitted to the second terminal 114. Specifically, the private key generator 116 generates the private key corresponding to the user ID by using the public key or the information within the Auth_token or the information within the ticket of the license. Here, the private key generator 116 may refer to the authentication token Auth_token generated by the authentication server 104 to determine whether the second terminal 114 is authorized to access the object by receiving private key from the private key generator 116. The second terminal 114 may decrypt the data stored in the cloud storage server 110 by using the private key.

Figure 6:
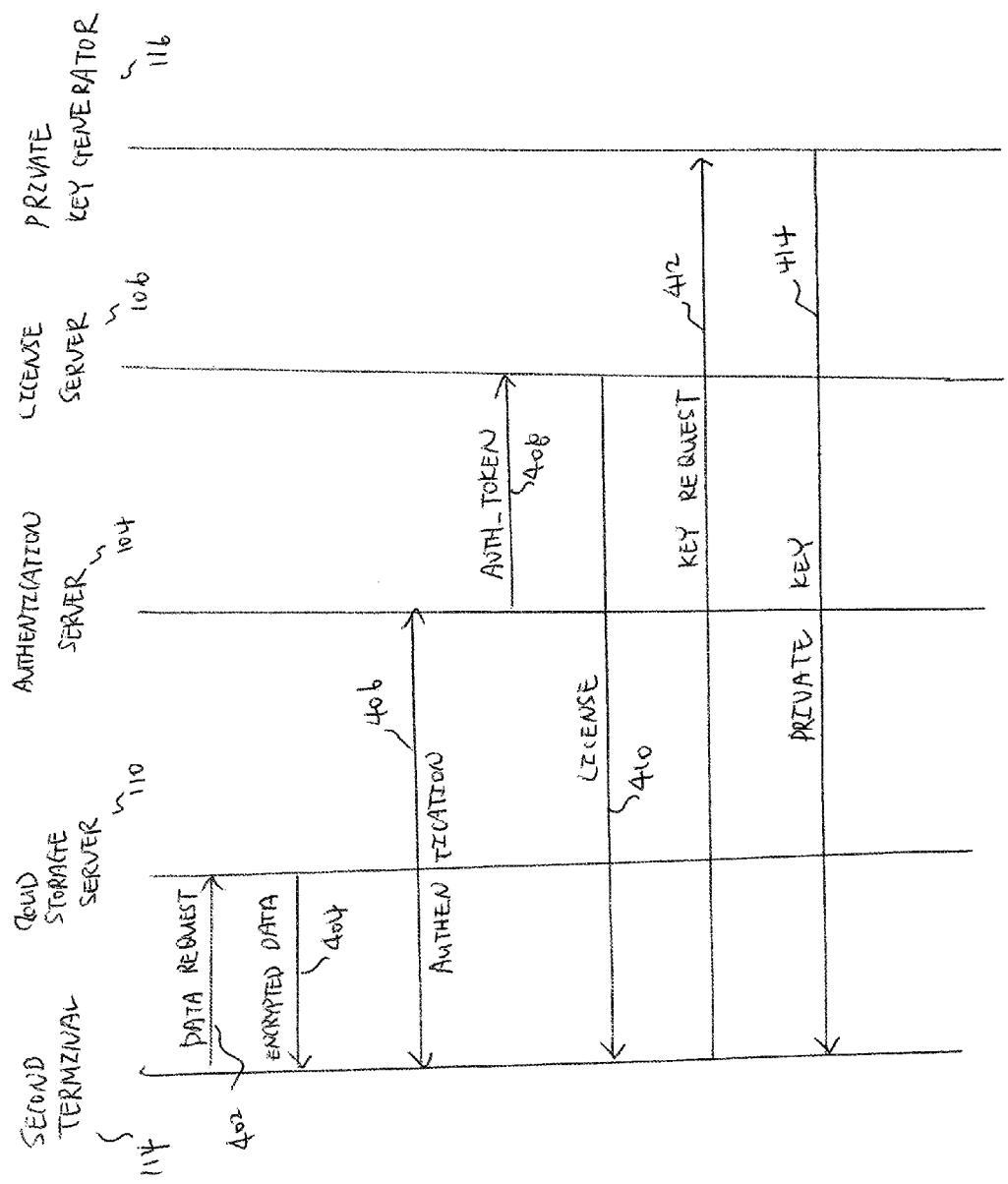
FIG. 6 is a sequence diagram illustrating an authentication and private key issuance process in an ID-based key management system according to an exemplary embodiment.

FIG. 6 is a sequence diagram illustrating an authentication and private key issuance process in an ID-based key management system according to an exemplary embodiment.

Referring to FIG. 6, first, the second terminal 114 requests data stored in the cloud storage server 110 (402) and receives encrypted data from the cloud storage server 110 (404).

Next, the second terminal 114 is redirected to the authentication server 104 to perform authentication (406). The authentication server 104 performs user authentication of the second terminal 114 using an ID and a password. When the second terminal 114 is authenticated by the authentication server 104, the authentication server 104 transmits an authentication token to the license server 106 and requests the license server 106 to generate a ticket (LS-Ticket) for accessing the data based on the user ID (408). Upon receiving a request, the license server 106 may refer to the authentication token Auth_token generated by the authentication server 104 to determine whether the second terminal 114 is authorized to access the content. When the second terminal 114 is authorized, the license server 106 generates a license including the public key and the ticket (LS_Ticket) corresponding to the user ID. Next, the license server 106 transmits the ticket for accessing the data based on the user ID to the second terminal 114 (410). In an exemplary embodiment, the public key may be the key encryption key used for encryption of content encryption key, where the public key is created using an identity (ID)-based cryptography (IBC). In other words, the content encryption key is encrypted directly for the user of the second terminal 114. However, it is understood that one or more other exemplary embodiments are not limited thereto, and the content encryption key may be encrypted using an RSA public key or a symmetric key. When the private key generator 116 receives a key request including the license from the second terminal 114 (412), the private key generator 116 generates and transmits the private key to the second terminal 114 (414).

As described above, FIG. 2 illustrates an exemplary embodiment in which all the files in a lowest level directory D31, D32, or D33 may be controlled by the same access control policy. In this case, the authentication server 104 and the license server 106 may handle access control and key management, respectively, for all of the files within the directory in a similar, homogenous fashion. Here, a key management process may employ a key hierarchy corresponding to the directory structure. When the directories are controlled by different access control policies, as shown in FIG. 3, files, objects, etc., in the directories may be encrypted in a different fashion according to, for example, an encryption policy field in the metadata for the directory.

Figure 7:
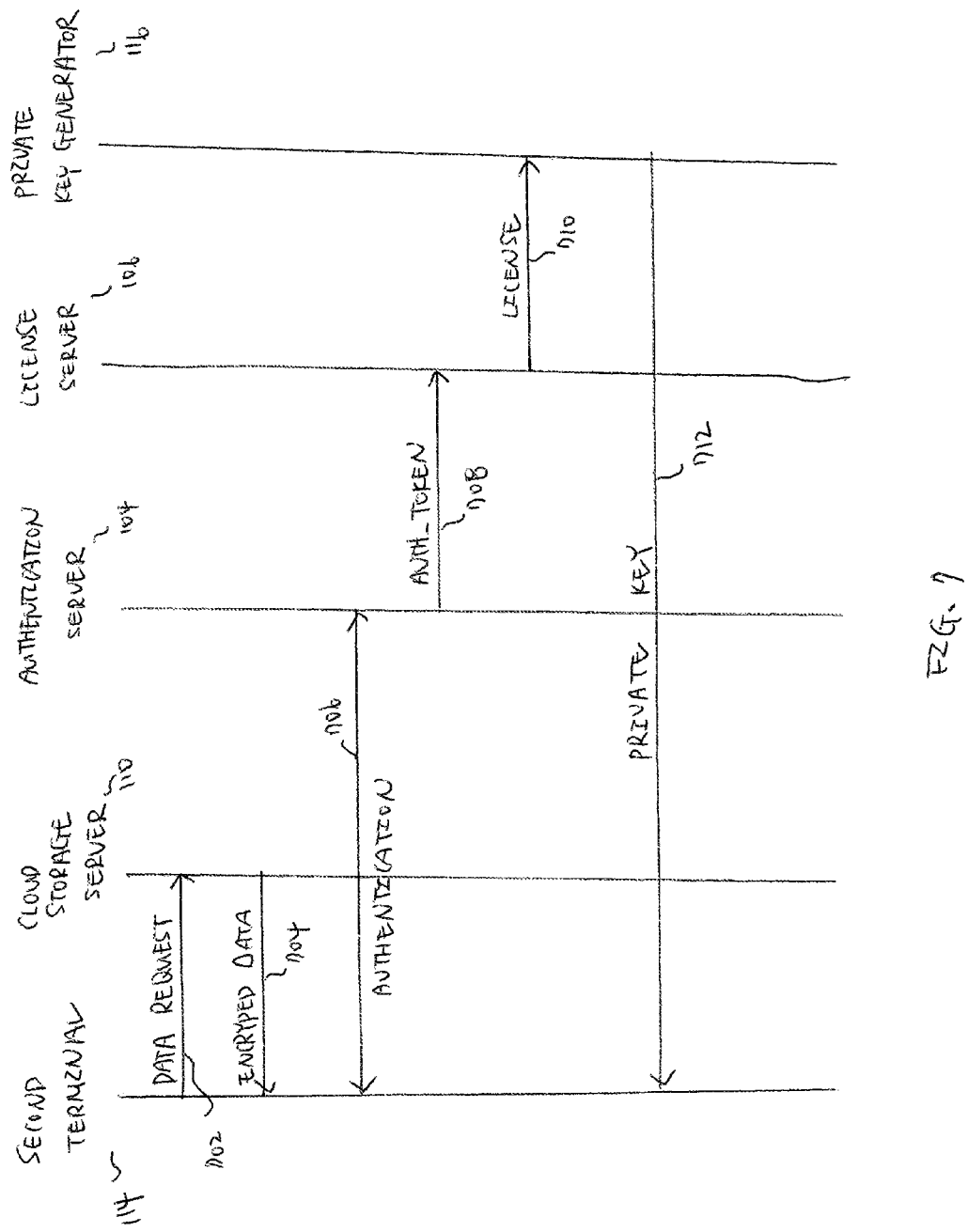
FIG. 7 is a sequence diagram illustrating an authentication and private key issuance process in an ID-based key management system according to another exemplary embodiment.

FIG. 7 is a sequence diagram illustrating an authentication and private key issuance process in an ID-based key management system according to another exemplary embodiment.

Referring to FIG. 7, similar to the exemplary embodiment of FIG. 6, the second terminal 114 requests data stored in the cloud storage server 110 (702), receives encrypted data from the cloud storage server 110 (704), and is redirected to the authentication server 104 to perform authentication (706). When the second terminal 114 is authenticated by the authentication server 104, the authentication server 104 transmits an authentication token to the license server 106 and requests the license server 106 to generate a ticket (LS-Ticket) for accessing the data based on the user ID (708). Based on the authentication token Auth_token generated by the authentication server 104, the license server 106 determines whether the second terminal 114 is authorized to access the content, and when the second terminal 114 is authorized, the license server 106 generates and transmits a license including a public key and the ticket (LS_Ticket) corresponding to the user ID to the private key generator 116 (710). Based on the license received from the license server 106, the private key generator 116 generates and transmits the private key to the second terminal 114 (712).

One or more exemplary embodiments may include a computer-readable recording medium having a program for performing methods described in the present specification on a computer. The computer-readable recording medium may include a program command, a local data file, and a local data structure individually or in combination. The above-described medium may be a medium specially designed and configured for the present disclosure or already known to and used for those skilled in the art of the computer software field. An example of the computer-readable recording medium includes magnetic media such as a hard disk, a floppy disk, and a magnetic tape, optical media such as a compact disc-read only memory (CD-ROM) and a digital versatile disc (DVD), a magneto-optical medium such as a floppy disk, and a hardware device specially formed to store and perform a program command, such as a ROM, a random access memory (RAM), and a flash memory. An example of the program command includes a high-level language code that can be executed by a computer using an interpreter as well as a machine language code made by a compiler. Furthermore, it is understood that any of the above-described apparatuses, servers, devices, etc., may include at least one hardware processor, circuitry, etc.

It should be understood that the exemplary embodiments described herein should be considered in a descriptive sense only and not for purposes of limitation. Descriptions of features or aspects within each embodiment should typically be considered as available for other similar features or aspects in other embodiments.

While one or more exemplary embodiments have been described with reference to the figures, it will be understood by those of ordinary skill in the art that various changes in form and details may be made therein without departing from the spirit and scope of the exemplary embodiments as defined by the following claims.

What is claimed is:

1. A cloud storage system, comprising:
an encryption server configured to encrypt a plurality of data by using encryption keys having a hierarchy, the hierarchy of encryption keys corresponding to a relationship among the plurality of encrypted data; and
a cloud storage server configured to store the plurality of encrypted data,
wherein at least two or more data are configured in a directory structure, the hierarchy of the encryption keys corresponding to the directory structure,
wherein the encryption keys are generated in a stateless manner based on key derivation information received by the encryption server, the key derivation information comprising information about a key derivation function, the key derivation function configured to determine an encryption key based on a root key and a directory path, the root key being a key at a top of the hierarchy of the encryption keys, and
wherein at least one of the encryption server and the cloud storage server is implemented by at least one hardware processor.

2. The cloud storage system according to claim 1, wherein the relationship among the plurality of encrypted data is determined according to an access policy for each data.

3. The cloud storage system according to claim 2, wherein, when at least two or more data have the same access policy, the two or more data are encrypted by using the same encryption key.

4. The cloud storage system according to claim 2, wherein all of data in each directory have the same access policy and are encrypted by using the same encryption key.

5. The cloud storage system according to claim 2, wherein the same data are encrypted by using the same encryption key regardless of a user who transmits the same data to be encrypted and stored in the cloud storage.

6. The cloud storage system according to claim 1, wherein the key derivation information further comprises auxiliary information comprising at least one from among the directory path, a validity period of an encryption key, a name of a group of users having an access right, a policy identification (ID), and a uniform resource identifier (URI) for locating the policy ID.

7. The cloud storage system according to claim 6, wherein the validity period is stored at the cloud storage server, and prior to or upon expiry of the encryption key, the cloud storage performs at least of one from among an alert, an action to renew the encryption key, an action to re-encrypt data with the renewed encryption key.

8. The cloud storage system according to claim 1, wherein a representational state transfer (REST) instruction containing data to be encrypted is received by the encryption server, the REST instruction comprising a URI location of a resource at which the key derivation instruction is stored.

9. A cloud storage system in which data encrypted by an encryption key are stored, the cloud storage system comprising:
an authentication server configured to authenticate a user based on an identification (ID) and a password of the user;
a license server configured to provide a license to access the encrypted data to the user based on a result of the authentication, the license comprising a key encryption key obtained by encrypting the encryption key; and a private-key generator configured to generate a private key for decrypting the encrypted data based on the license, wherein at least two or more data are configured in a directory structure, the hierarchy of encryption keys corresponding to the directory structure, wherein the encryption keys are generated in a stateless manner based on key derivation information, the key derivation information comprising information about a key derivation function, the key derivation function configured to determine the encryption key based on a root key and a directory path, the root key being a key at a top of the hierarchy of the encryption keys, and wherein at least one of the authentication server, the license server, and the private-key generator is implemented by at least one hardware processor.

10. The cloud storage system according to claim 9, wherein the key encryption key comprises at least one from among a Rivest-Shaman-Adleman (RSA) public key, an identification (ID)-based cryptography (IBC) public key, and a symmetric key, and the key encryption key is delivered to the user through a secure channel.

11. The cloud storage system according to claim 9, wherein, when the user is authenticated by the authentication server, the authentication server generates an authentication token to be used by at least of one the user, the license server and the private key generator.

12. The cloud storage system according to claim 11, wherein the license comprises a license server ticket generated based on the authentication token, and the private key generator authenticates, prior to generating the private key, the user based on the license server ticket.

13. The cloud storage system according to claim 12, wherein the license server ticket comprises at least one from among the password and a function of the password of the user.

14. The cloud storage system according to claim 11, wherein, when the user is authenticated by the authentication server, the authentication server generates authentication tokens for the license server and the private key generator, respectively.

15. An encryption method in a cloud storage system, the encryption method comprising:

receiving a plurality of data from a user; and encrypting, at an encryption server separate from the cloud storage system, a plurality of data by using encryption keys having a hierarchy, the hierarchy of encryption keys corresponding to a relationship among the plurality of encrypted data, wherein the plurality of encrypted data are stored in the cloud storage system, wherein at least two or more data are configured in a directory structure, the hierarchy of the encryption keys corresponding to the directory structure, wherein the encryption keys are generated in a stateless manner based on key derivation information received by the encryption server, the key derivation information comprising information about a key derivation function, the key derivation function configured to determine an encryption key based on a root key and a directory path, the root key being a key at a top of the hierarchy of the encryption keys, and wherein the encryption server is implemented by at least one hardware processor.

16. An encryption method according to claim 15, wherein the relationship among the plurality of encrypted data is determined according to an access policy for each data.

17. An encryption method according to claim 16, wherein, when at least two or more data have the same access policy, the two or more data are encrypted by using the same encryption key.

* * * * *